US005285801A

United States Patent [19]

[11] Patent Number: 5,285,801

[45] Date of Patent: Feb. 15, 1994

Klenk

[54] MACHINE FOR THE CLEANING OF BOTTLES OR THE LIKE

[75] Inventor: Klaus Klenk, Worms, Fed. Rep. of Germany

[73] Assignee: KRONES AG Hermann Kronseder Maschinenfabrik, Neutraubling, Fed. Rep. of Germany

[21] Appl. No.: 933,474

[22] Filed: Aug. 21, 1992

[30] Foreign Application Priority Data

Aug. 24, 1991 [DE] Fed. Rep. of Germany ....... 9110492

[51] Int. Cl.[5] .......................... B08B 3/02; B08B 3/04; B65G 21/18

[52] U.S. Cl. ...................................... 134/73; 134/124; 134/131; 134/132; 198/778

[58] Field of Search ....................... 134/67, 68, 70, 71, 134/72, 73, 79, 124, 127, 128, 131, 132; 198/778; 15/60, 61

[56] References Cited

U.S. PATENT DOCUMENTS

| | | | |
|---|---|---|---|
| 1,746,644 | 2/1930 | Fox | 198/778 |
| 1,910,241 | 5/1933 | Chapman | 198/778 X |
| 2,011,786 | 8/1935 | Walker | 134/70 |
| 2,094,398 | 9/1937 | Dostal | 134/128 X |
| 2,516,998 | 8/1950 | Kimball et al. | 134/68 X |
| 2,834,453 | 5/1958 | Domensino | 198/778 |
| 4,803,055 | 2/1989 | Ueda | 134/73 X |
| 5,010,808 | 4/1991 | Lanham | 198/778 X |

FOREIGN PATENT DOCUMENTS

| | | | |
|---|---|---|---|
| 2844126 | 4/1979 | Fed. Rep. of Germany . | |
| 444707 | 12/1974 | U.S.S.R. | 198/778 |
| 549417 | 7/1977 | U.S.S.R. | 134/132 |
| 810607 | 3/1981 | U.S.S.R. | 134/124 |

*Primary Examiner*—Philip R. Coe
*Attorney, Agent, or Firm*—Finnegan, Henderson, Farabow, Garrett & Dunner

[57] ABSTRACT

A machine for the cleaning of bottles having an endless conveyor for transporting the bottles through the machine and past associated treatment devices, the endless conveyor being guided in a horizontally extending, spiral-like path through at least two portions of the machine, the path of travel extending in one direction in a first portion and in the opposite direction in a second portion, the two paths of travel of the endless conveyor being disposed one above the other within the machine.

21 Claims, 2 Drawing Sheets

MACHINE FOR THE CLEANING OF BOTTLES OR THE LIKE

BACKGROUND OF THE INVENTION

The invention relates to a machine for the cleaning of bottles or the like.

Such a machine is already known from German Patent No. 2844126, in which two portions of an endless conveyor are disposed at the same level in spaced side-by-side relationship with transverse movement in opposite directions. The two portions have in each case different base surfaces, and each winding of the endless conveyor is provided with a housing of its own. This construction is extremely space-consuming and expensive.

The invention is based on the object of substantially reducing the space requirements and the constructional expenditure without impairment to the treatment line in a machine for cleaning bottles or the like.

SUMMARY OF THE INVENTION

This object is achieved in accordance with the present invention by providing a machine for the cleaning of bottles or the like comprising an endless conveyor for bottles and treatment devices allocated to it, the endless conveyor being guided in at least two portions with transverse motion in opposite directions in a spiral-like manner, the two portions of the endless conveyor and the associated treatment devices being disposed one above the other.

BRIEF DESCRIPTION OF THE DRAWINGS

An example of embodiment of the invention is described in the drawings, in which.

DETAILED DESCRIPTION OF THE INVENTION

Figure 1:
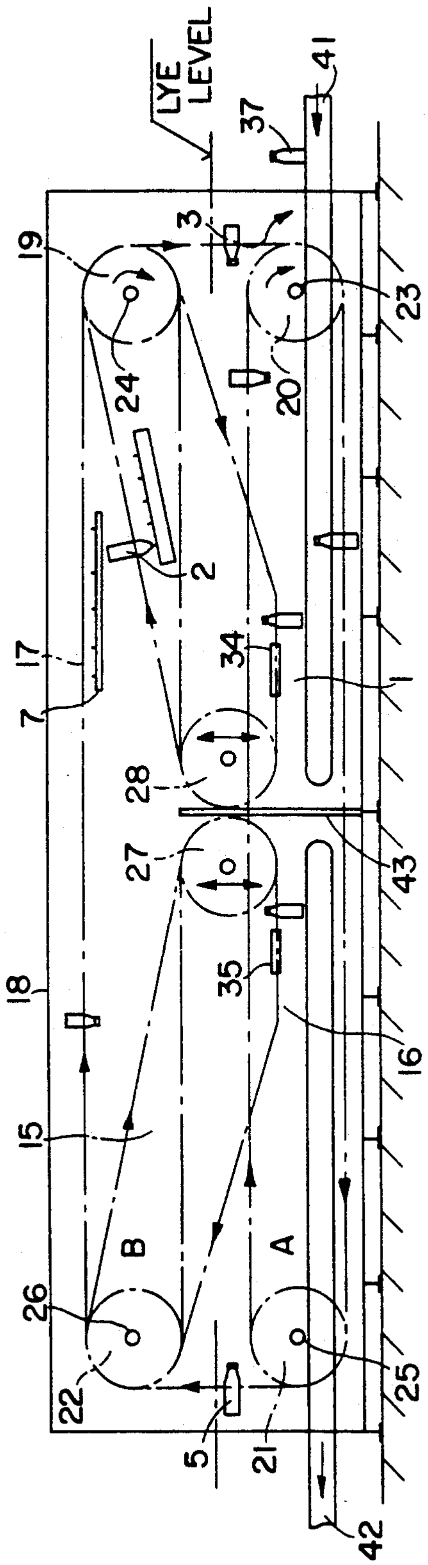
FIG. 1 is a schematic side view of the machine of the invention for the cleaning of bottles.

The machine according to FIGS. 1 to 4 is set up for the cleaning of returnable PET bottles 37—hereafter bottles —which have a projecting supporting ring in the neck below the bottle head. The machine has a box-shaped or quad-shaped housing 18 with two parallel front, side and bottom or top surfaces each, which are constructed in conventional fashion from plates firmly connected with each other and partly detachable and by means of several legs at the bottom of a filling system in horizontal alignment.

In the area of the each of the two end, of the housing 18, two horizontal shafts 23 to 26 are rotatably mounted one above the other in a vertical plane and parallel with the ends. Six pairs of lower deflection wheels 20 and 21 each in the form of gearwheels are affixed to the two lower shafts 23 and 25 which are at the same level. Seven pairs of upper deflection wheels 19 and 22 in the form of gearwheels are affixed to the upper shafts 24 to 26 which are at the same level. The deflection wheels are disposed in a total of several vertical double planes aligned in parallel to the longitudinal sides of the housing 18 and disposed at the same distance to each other. The double planes and the associated deflection wheels are provided with the index "a" to "g". In the frontmost double plane "g" two additional deflection wheels 27, 28 are mounted freely rotatably at the same level in side-by-side relationship with axes aligned in parallel to the shafts 23 to 26 at a level between a lower deflection wheels 20, 21 and the upper deflection wheels 19, 22 in the center of the longitudinal side. At least the two shafts 23, 24 disposed on the same end of the housing 18 are continuously driven at the same speed and in the same direction of rotation synchronously to each other by a gear motor 38 or the like.

Figure 3:
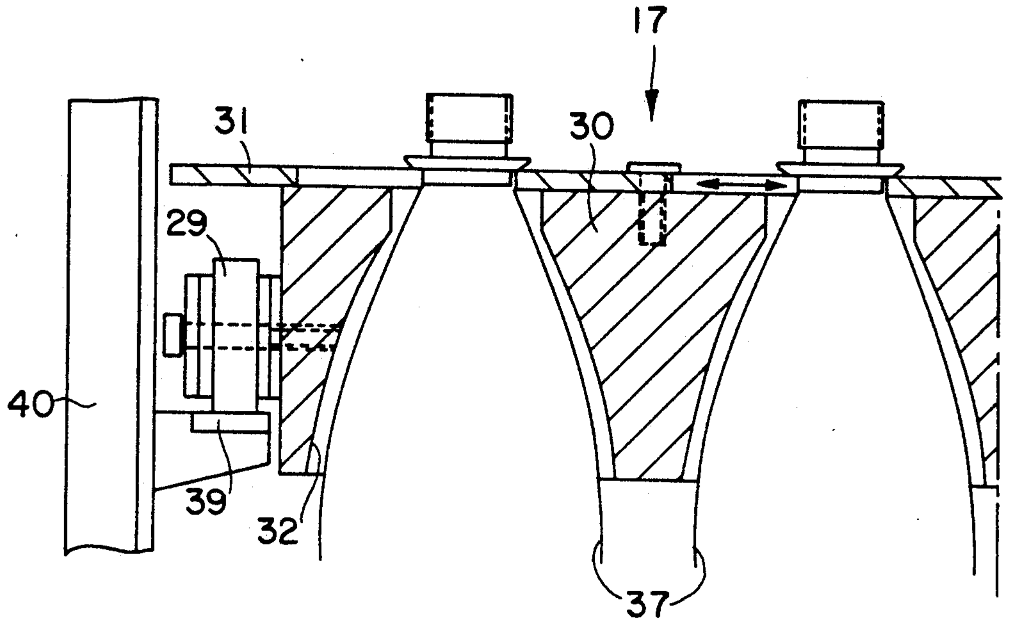
FIG. 3 is a partial vertical sectional view through the endless conveyor for the bottles in the area of a bottle carrier.

As best shown in FIG. 3, an and endless conveyor 17 for the bottles 37 is guided via the pair of deflection wheels. It has two parallel, endless roller chains 29 (only one of which is shown) whose rollers are guided on horizontal, linear running rails 39 in the area between two deflection wheels. The running rails 39 are either fastened to the longitudinal sides of the housing 18 or to supports 40 disposed in the interior of the housing 18. A plurality of bottle carriers 30 are fastened between the two roller chains 29 in horizontal alignment transversely to the direction of movement, which receive in each case one row of four bottles 37.

Figure 4:
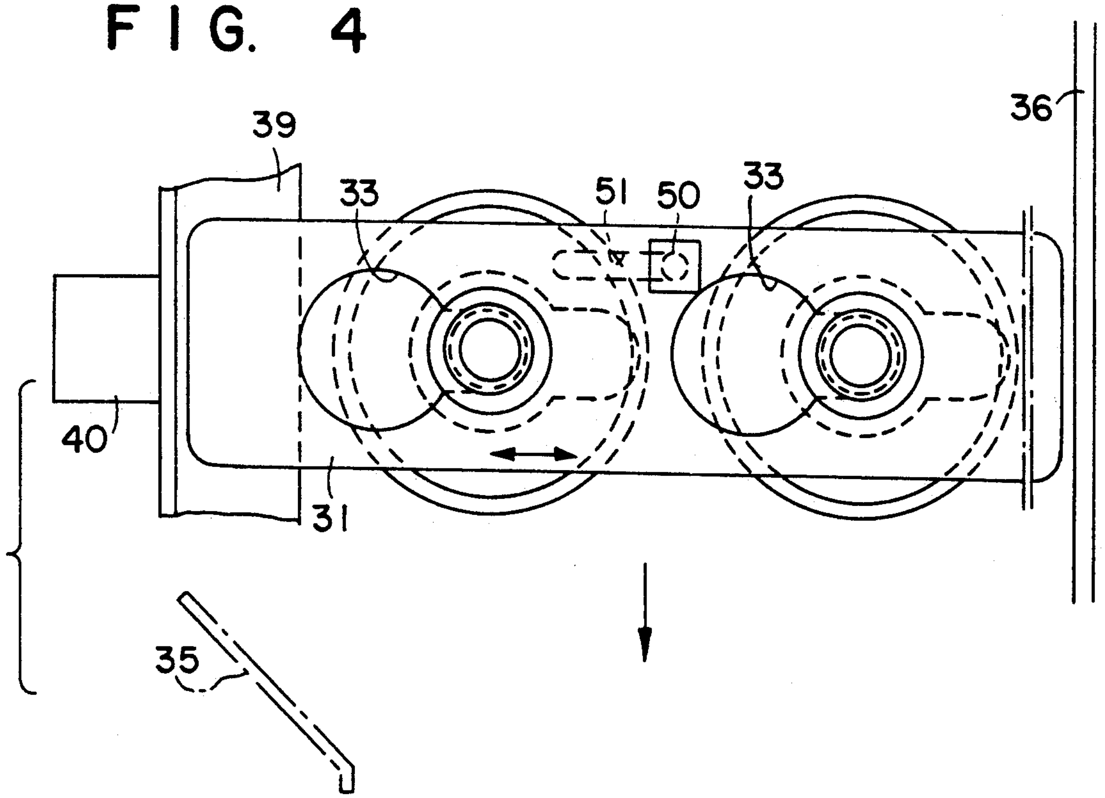
FIG. 4 shows the partial top view of the bottle carrier according to FIG. 3.

As is shown by FIGS. 3 and 4, each bottle carrier 30 is designed as a bar-like shaped part with four parallel bottle cells 32 adapted to the bottle neck. The bottle head and the bottle body project from the bottle cells 32. A clamping element in the form of a plate 31 is displaceably mounted in longitudinal direction, between two end positions, e.g. by means of bolts 50 and oblong holes 51, in the area of the bottle head at the plane front side of the bottle carrier 30. The plate is provided with four keyhole-like openings 33, whose larger area permits the passage of a bottle head and whose smaller area corresponds approximately to the diameter of the bottle neck below the supporting ring or is slightly larger than the same. In the righthand end or release position of the plate 31 (not shown) the larger areas of the openings 33 are over the corresponding openings of the bottle cell 32 for the bottle head. In this position, a bottle 37 can be guided into the bottle cell 32 or out of it. In the shown lefthand end or clamping position in which the smaller area or the opening 33 now lies over the bottle cell 32, the bottles are held by means of the plate 31 below the supporting ring and can thus not fall out of the bottle cells 32. The mounting is relatively loose, so that the cleaning solution can penetrate.

The transfer of the plates 31 between their two end positions is effected by means of stationary cam pieces 34 and 35 extending obliquely to the direction of movement. The one cam piece 35, which transfers the plates 31 from the shown clamping position into the not shown release position is disposed in the area of the bottle discharge means 16. The other cam piece 34 which transfers the plates 31 from the release position into the clamping position is disposed in the area of the bottle means 1. The cam pieces 34, 35 engage directly a correspondingly rounded edge surface of the plates 31. A stationary guide means 36 also engages this edge area of the plates that which is disposed in the treatment stations along the revolving portion of the endless conveyor 17 to hold the plates 31 in the clamping position. Additional locking elements for the plates 31 are thus not required, and the structure of the bottle carriers 30 and their clamping elements is extremely simple and operationally reliable.

Bottle feeder means 1 and bottle discharge means 16 are disposed adjacent on the front longitudinal side of the housing 18. The bottles 37 to be cleaned are fed into the machine by means of a horizontal conveyor belt 41, which ends shortly before the center of the machine and are discharged by means of a further horizontal conveyor belt 42, which begins shortly after the center of the machine. The two conveyor belts 41, 42 are located within the frontmost plane "g", and are disposed at the same level and continuously driven at the same speed as the endless conveyor 17 in the direction of the arrows. By means of a separating means of customary construction (not shown) the bottles 37 are lined up in parallel groups of four on the conveyor belt 41 in accordance with the arrangement of the bottle cells 32 in such fashion that one row of bottles each coincides with a bottle carrier 30 fed obliquely from above by the endless conveyor 17 in the area of the bottle means 1. The bottles penetrate completely into the bottle cells 32 with their heads and neck portions until the bottle head project again from the bottle cells 32. In this area the plate 31 is transferred from the release position into the clamping position by means of the stationary cam piece 34. Vice versa, the plates 31 arriving in the area of the discharge means 16 are transferred to the release position from the clamping position by means of the stationary cam piece 35 so that the bottles can stand freely on the discharge conveyor belt 42. Subsequently, the endless conveyor 17 with the bottle carriers 30 is guided obliquely upwardly away from the conveyor belt 42 so that the bottles 37 can leave the bottle cells 32 downwardly.

As best shown in FIG. 1, endless conveyor 17 extends within the double plane "g" from the lower side of the deflection wheel 19 in plane g obliquely downwardly towards the conveyor belt 41, passes a short horizontal portion at the cam piece 34, then loops the additional deflection wheel 28 and then obliquely upwardly towards the deflection wheel 19 in plane f. The endless conveyor 17 extends vertically downwardly from the same towards the deflection wheel 20 in plane f and from its lower side within the double plane "f" to the lower side of the deflection wheel 21 in plane f. After having doubled it by 180 degrees, the endless conveyor 17 extends from the upper side of the deflection wheel 21 in plane f obliquely out of the double plane "f" into the double plane "e" towards the upper side of the deflection wheel 20 in plane e. It loops the same and extends from its lower side to the lower side of the deflection wheel 21 in plane e. In correspondingly fashion, the endless conveyor continues to wind itself through the double planes "d", "c", "b" into the double plane "a". The lower path of travel of the endless conveyor belt 17 between wheels extends in each case within or in parallel to a double plane, while the upper path extends obliquely from one double plane to the next.

The endless conveyor 17 extends vertically upwardly from the deflection wheel 21 in plane a to the deflection wheel 22 in plane a from its upper side to the upper side of the deflection wheel 19 in plane a. It loops the same by 180 degrees and extends from its lower side out of the double plane "a" obliquely into the next double plane "b" to the lower side of the deflection wheel 22 in plane a. It loops the same by 180 degrees and extends from its upper side within the double plane "b" to the upper side of the deflection wheel 19 in plane a. In corresponding fashion, the endless conveyor winds itself through the planes "c", "d", "e" into the plane "f". The upper path of travel of the endless conveyor 17 extends in each case in parallel to or within the double planes, while the lower path of travel continues to extend obliquely to the adjacent double plane. From the upper side of the deflection wheel 22 in plane f the endless conveyor extends obliquely downwardly and obliquely out of the double plane "f" into the double plane "g" to the upper side of the additional deflection wheel 27. It loops the same and then extends from its lower side in the area of the cam piece 35 horizontally within the double plane "g" and then obliquely upwardly to the lower side of the deflection wheel 22 in plane g. It loops the same and then extends from its upper side within the double plane "g" to the upper side of the deflection wheel 19 in plane g.

Figure 2:
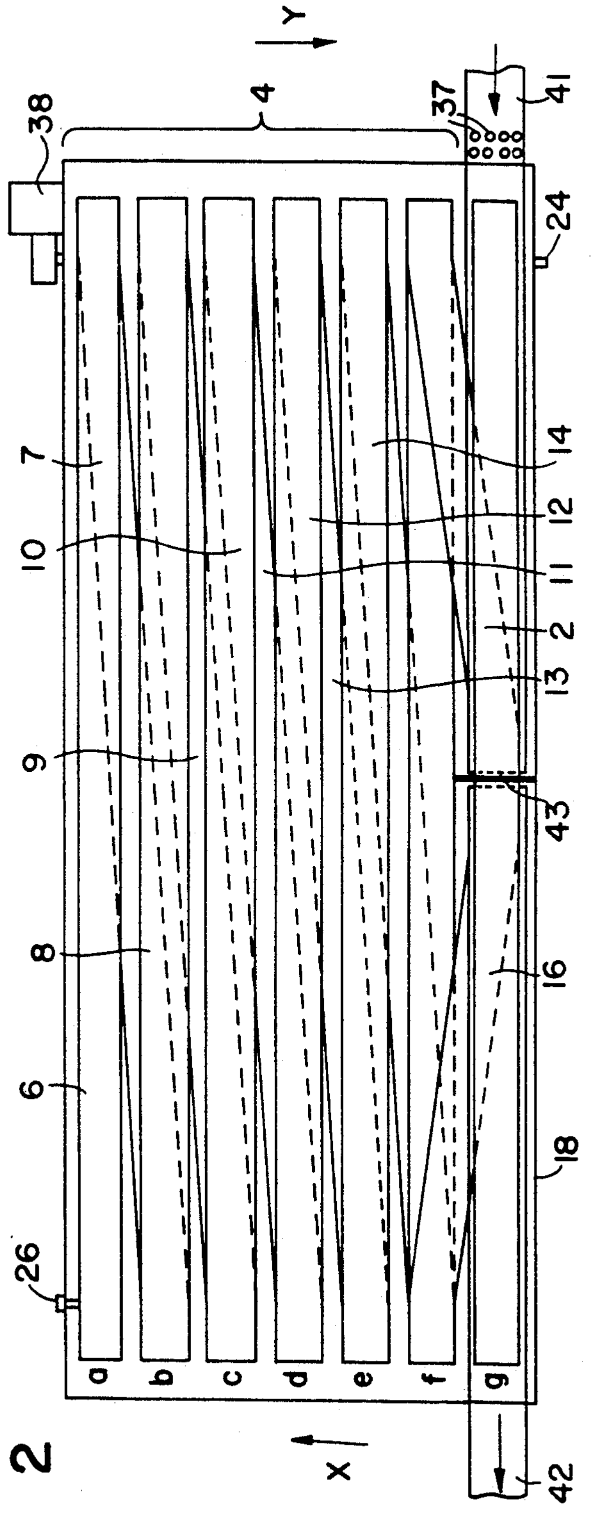
FIG. 2 is a schematic top view of the machine according to FIG. 1.

Due to the aforementioned guiding of the endless conveyor 17, the interior of the housing 18 is completely utilized, and in addition to a very long treatment line, a simple feeding and discharge of the bottles 37 is also made possible through the obliquely downwardly or obliquely upwardly extending portions of the belt within the bottle feeder means 1 or the bottle discharge means 16. As is shown by FIGS. 1 and 2, the movement paths of the endless conveyors 17 are overlapping—seen from above—in the lower portion A defined by the lower deflection wheels 20, 21 and in the upper portion B defined by the upper deflection wheels 19, 22. In the lower portion A the endless conveyor spirals away from the front side of the housing a horizontal direction, while it spirals towards the front side of the housing 18 in a horizontal direction in the upper portion B the style. As a result, the transverse movement indicated by the arrow X occurs in the portion A and the transverse movement of the endless conveyor 17 indicated by the arrow Y occurs in the portion B.

In order to prevent reinfection of the cleaned bottles 37, a partition wall 43 is arranged between the bottle feeder means 1 and the bottle discharge means 16 in the area between the two additional deflection wheels 28, 27. Moreover, the mounting of the deflection wheel 27 and the mounting of the deflection wheel 28 is designed to be vertically adjustably for to be able to adapt the machine to different bottle heights, in each case together with a short horizontal guide rail (not shown) for the horizontal revolving portion of the endless conveyor 17.

The bottles arriving from the bottle feeder means 1 are turned and pass at first a cleaning means 2 for emptying and prespraying. Subsequently, they are immersed into the cleaning solution bath 3, which is filled with hot lye and comprises the entire lower portion A of the endless conveyor 17 with the double planes "a" to "f". There the bottles 37 remain completely submerged for about 7 minutes, a strong cleaning effecting resulting due to the movement of the bottles 37. Then the bottles travel upwardly at 5 into the portion B, are turned and emptied at 6. Thereafter, they pass through a spraying means 7 with cleaning solution and are immersed into a first water bath 9 at 8 after a drip-draining. In similar fashion further sprayings at 10, 12 and 14 with water and dippings at 11 and 13 with water follow. A last drip-draining of the bottles is carried out at 15, before they get to the bottle discharge means 16.

The upper side of the endless conveyor 17 extends in each case within the corresponding double plane in the upper portion B. There the stationary or also oscillatingly driven spray tubes of the various sprayings are disposed. The lower sides extend in each case obliquely from one double plane to the other one. There the correspondingly inclined dippings are disposed.

Due to the superimposed arrangement of the various portions of travel of the endless conveyor, the treatment line can be enlarged several times within the same base area. In the most simple case, two portions are superimposed, however, there can also be more portions. The movement component of the endless conveyor is understood to be a substantially horizontally directed, spiral-like transverse movement in each of the portions of travel.

As especially compact and simple construction results, if, according to the invention, the two portions with opposite transverse motion have the same base surface and are disposed directly one above the other in a common, preferably quad-shaped housing.

The different treatment devices can be affixed without problems along the endless conveyor in the at least two superimposed portions. In accordance with the invention, the lowermost portion is used for a cleaning solution bath, e.g. hot lye, into which the endless conveyor including the bottles is completely immersed for a longer period of time, while the portion located over it is used for dippings, e.g. for water baths and spraying stations. In this fashion, an excellent cleaning of all types of returnable bottles is possible.

We claim:

1. A machine for the cleaning of bottles comprising bottle feeder means for feeding bottles to be cleaned to said machine, bottle discharge means for discharging cleaned bottles from said machine, an endless conveyor mounted for traveling movement in said machine between said feeder means and said discharge means, said endless conveyor having bottle carrier means thereon for receiving bottles from said feeder means, transporting the bottles suspended therefrom past a variety of bottle treatment means and for releasing the bottles to said discharge means, said endless conveyor belt traveling in a first path of travel in a horizontally directed spiral-like manner in a first traverse direction in a first portion of the machine and then in at least a second path of travel in a horizontally directed, spiral-like manner in a second transverse direction opposite said first direction in a second portion of the machine, said paths of travel being disposed one above the other in said machine.

2. The machine of claim 1, wherein the two paths of travel occupy substantially the same horizontal area in said machine.

3. The machine of claim 1, wherein the two paths of travel are located one above the other in a common housing, the bottle feeder means feeding bottles to be cleaned into said housing and the bottle discharge means discharging cleaned bottles from said housing.

4. The machine of claim 3, wherein the bottle feeder means and the bottle discharge means are disposed adjacent a side of the housing, the endless conveyor traversing away from said side and the bottle feeder means in said first path of travel in a lower portion of said housing and back towards said side and the bottle discharge means in said second path of travel in an upper portion of the housing.

5. The machine of claim 4, including two sets of deflection wheels in each said portion of the machine that guide the paths of travel of the endless conveyor in a spiral-like manner, the wheels in each set having a common axis of rotation.

6. The machine of claim 5, wherein the deflection wheels that guide the endless conveyor within said paths of travel are looped by the endless conveyor by about 180 degrees.

7. The machine of claim 5, wherein the axes of rotation of the deflection wheels in each portion of the machine are horizontally disposed and the two sets in the upper portion are located in a common vertical plane with the two sets in the lower portion.

8. The machine of claim 5 wherein the deflection wheels in each set are mounted for rotation on a common shaft and drive means for rotating at least one of said shafts.

9. The machine of claim 5, including two additional deflection wheels mounted in a central portion of the housing between the upper and lower portions thereof, a first additional wheel being adjacent the bottle feeder means and a second additional guide, respectively, the endless conveyor into a position for the bottle carrier means to receive bottles from the bottle feeder means and for the bottle carrier means to release bottles to the bottle discharge means.

10. The machine of claim 9, wherein the endless conveyor is guided by the first additional deflection wheel at first obliquely downwardly to the bottle feeder means and then obliquely upwardly to the upper portion of the housing, then by a deflection wheel substantially vertically downward to the lower portion for travel through said first path of travel and then by another deflection wheel substantially vertically upwardly to the upper portion for travel through said second path of travel.

11. The machine of claim 10, wherein the bottle treatment means includes emptying and prespraying means disposed along said obliquely upwardly directed path of travel of the endless conveyor.

12. The machine of claim 10, wherein the endless conveyor at the end of the second path of travel is guided by the second additional deflection wheel obliquely downwardly from the upper portion of the housing to said bottle discharge means then obliquely upwardly to the upper portion of the housing.

13. The machine of claim 4, where the bottle treatment means includes a cleaning solution bath in the lower portion of the housing through which passes said endless conveyor in its first path of travel with the bottles to be cleaned suspended therefrom.

14. The machine of claim 13, wherein at the end of the first path of travel, the endless conveyor is guided substantially vertically upwardly by a deflection wheel from the cleaning solution bath into the upper portion of the housing.

15. The machine of claim 4, wherein the bottle treatment means includes spraying means and dipping means located in the upper portion of the housing.

16. The machine of claim 1, wherein the endless conveyor comprises at least one flexible traction means, said bottle carrier means comprising a plurality of plates, each receiving a row of bottles, said plates being linked to the traction means transversely to the direction of movement of the traction means.

17. The machine of claim 16, wherein the bottles have openings at the head thereof and narrower necks below said heads and the bottle carrier plates have a plurality of openings for receiving the heads of the bottles and movable clamping elements engageable with the bottle necks below said heads to clamp and suspend said bottles by their necks form said plates.

18. The machine of claim 17, wherein each clamping element is a clamping plate slidably mounted on the bottle carrier plate transverse to the direction of travel of said conveyor belt between a clamping position and a release position, said clamping plates having a keyhole opening therein having a larger and smaller area, the larger area permitting the passage of a bottle head when the clamping plate is in the release position and the smaller area being approximately the size of the bottle neck for suspending the bottle from the carrier plate when the clamping plate is in the clamping position.

19. The machine of claim 18, wherein stationary cam elements are disposed along the path of travel of the endless conveyor for sliding the clamping plate between said clamping and release positions.

20. The machine of claim 19, wherein the clamping plates are held in their clamping position by a stationary guide means disposed along the paths of travel of the endless conveyor.

21. The machine of claim 1, wherein the paths of travel of the endless conveyor overlap each other in the two portions of the machine.

* * * * *

UNITED STATES PATENT AND TRADEMARK OFFICE

CERTIFICATE OF CORRECTION

PATENT NO. : 5,285,801

DATED : February 15, 1994

INVENTOR(S) : Klaus Klenk

It is certified that error appears in the above-indentified patent and that said Letters Patent is hereby corrected as shown below:

Claim 9, column 6, line 20, after "additional" insert --wheel being adjacent the bottle discharge means to--;

and

Claim 17, column 7, line 2, change "form" to --from--.

Signed and Sealed this

Twentieth Day of September, 1994

Attest:

BRUCE LEHMAN

*Attesting Officer*

*Commissioner of Patents and Trademarks*